(12) United States Patent
Madhavan et al.

(10) Patent No.: US 12,339,889 B1
(45) Date of Patent: Jun. 24, 2025

(54) MACHINE LEARNING FOR CLUSTERING UNSTRUCTURED DATA

(71) Applicant: BLACKROCK FINANCE, INC, New York, NY (US)

(72) Inventors: Ananth Narayan Madhavan, San Francisco, CA (US); Aleksander Jan Sobczyk, San Francisco, CA (US); Jason Michael Ribando, Walnut Creek, CA (US)

(73) Assignee: BlackRock Finance, Inc., New York, NY (US)

( * ) Notice: Subject to any disclaimer, the term of this patent is extended or adjusted under 35 U.S.C. 154(b) by 99 days.

(21) Appl. No.: 17/138,006

(22) Filed: Dec. 30, 2020

(51) Int. Cl.
| | |
|---|---|
| *G06F 16/35* | (2025.01) |
| *G06F 16/28* | (2019.01) |
| *G06N 20/00* | (2019.01) |
| *H04L 67/10* | (2022.01) |

(52) U.S. Cl.
CPC ............ *G06F 16/35* (2019.01); *G06F 16/283* (2019.01); *G06N 20/00* (2019.01); *H04L 67/10* (2013.01)

(58) Field of Classification Search
CPC ........ G06F 16/35; G06F 16/283; G06N 20/00
See application file for complete search history.

(56) References Cited

U.S. PATENT DOCUMENTS

| | | | | |
|---|---|---|---|---|
| 10,546,340 | B1 * | 1/2020 | Ross | G06Q 40/08 |
| 11,373,117 | B1 * | 6/2022 | Cui | G06F 16/285 |
| 2014/0279301 | A1 * | 9/2014 | Chew | G06F 16/273 |
| | | | | 705/30 |
| 2020/0012886 | A1 * | 1/2020 | Walters | G06F 8/71 |
| 2020/0342006 | A1 * | 10/2020 | Rossi | G06F 16/285 |
| 2020/0388384 | A1 * | 12/2020 | Kunitomi | G16H 70/60 |

\* cited by examiner

*Primary Examiner* — Courtney Harmon
(74) *Attorney, Agent, or Firm* — Haynes and Boone, LLP

(57) ABSTRACT

Systems, methods, and computer program products for cluster data in a computing network are provided. Different computing devices in a network generate data structures. These data structures have different attributes. A machine learning system is provided to cluster the data structures with the same attributes into clusters. In this way, data structures that include image data are clusters according to the same images. Data structures that include network configuration data are clusters according to the same network configuration data. Data structures that include textual documents are clusters according to the same textual documents or corresponding abstracts.

20 Claims, 13 Drawing Sheets

200

| | Attributes 110A-F | | | | | |
|---|---|---|---|---|---|---|
| | A | B | C | D | E | F |
| DS 208A | 16.9 | 7.7 | 21.5 | 0.0 | 23.1 | 30.8 |
| DS 208B | 0.0 | 17.6 | 27.0 | 45.9 | 2.7 | 6.8 |

Data Structures 108A-108J

| 110 | 108A | 108B | 108C | 108D | 108E | 108F | 108G | 108H | 108I | 108J |
|---|---|---|---|---|---|---|---|---|---|---|
| 110A | 1690 | 0 | 1690 | 0 | 0 | 1690 | 3550 | 500 | 1100 | 5000 |
| 110B | 770 | 1760 | 770 | 1760 | 1760 | 770 | 1500 | 8000 | 0 | 0 |
| 110C | 2150 | 2700 | 2150 | 2700 | 2700 | 2150 | 2000 | 500 | 400 | 0 |
| 110D | 0 | 4590 | 0 | 4590 | 4590 | 0 | 2500 | 0 | 0 | 4900 |
| 110E | 2310 | 270 | 2310 | 270 | 270 | 2310 | 450 | 900 | 8500 | 0 |
| 110F | 3080 | 680 | 3080 | 680 | 680 | 3080 | 0 | 100 | 0 | 100 |

Data Structures 108A-108J

| 110  | 108A | 108B | 108C | 108D | 108E | 108F | 108G | 108H | 108I | 108J |
|------|------|------|------|------|------|------|------|------|------|------|
| 110A | 16.9 | 0.0  | 16.9 | 0.0  | 0.0  | 16.9 | 35.5 | 5.0  | 11.0 | 50.0 |
| 110B | 7.7  | 17.6 | 7.7  | 17.6 | 17.6 | 7.7  | 15.0 | 80.0 | 0.0  | 0.0  |
| 110C | 21.5 | 27.0 | 21.5 | 27.0 | 27.0 | 21.5 | 20.0 | 5.0  | 4.0  | 0.0  |
| 110D | 0.0  | 45.9 | 0.0  | 45.9 | 45.9 | 0.0  | 25.0 | 0.0  | 0.0  | 49.0 |
| 110E | 23.1 | 2.7  | 23.1 | 2.7  | 2.7  | 23.1 | 4.5  | 9.0  | 85.0 | 0.0  |
| 110F | 30.8 | 6.8  | 30.8 | 6.8  | 6.8  | 30.8 | 0.0  | 1.0  | 0.0  | 1.0  |

FIG. 4B

Matrix R =

| 0.00 | 0.00 | 0.14 | 0.52 |
|------|------|------|------|
| 0.94 | 0.04 | 0.00 | 0.00 |
| 0.01 | 0.34 | 0.11 | 0.05 |
| 0.00 | 0.49 | 0.00 | 0.43 |
| 0.04 | 0.00 | 0.57 | 0.00 |
| 0.00 | 0.13 | 0.18 | 0.00 |

Matrix H =

| 0.07 | 0.15 | 0.07 | 0.15 | 0.15 | 0.07 | 0.15 | 0.95 | 0.00 | 0.00 |
|------|------|------|------|------|------|------|------|------|------|
| 0.22 | 0.84 | 0.20 | 0.84 | 0.84 | 0.20 | 0.14 | 0.00 | 0.00 | 0.02 |
| 0.53 | 0.00 | 0.56 | 0.00 | 0.00 | 0.56 | 0.11 | 0.08 | 1.30 | 0.00 |
| 0.00 | 0.04 | 0.02 | 0.04 | 0.04 | 0.02 | 0.57 | 0.00 | 0.00 | 1.02 |

| q | 1 | 2 | 3 | 4 | 5 | 6 |
|---|---|---|---|---|---|---|
| RMSE | 0.192 | 0.149 | 0.090 | 0.070 | 0.022 | 0.021 |

FIG. 6

| | 108A | 108B | 108C | 108D | 108E | 108F | 108G | 108H | 108I | 108J |
|---|---|---|---|---|---|---|---|---|---|---|
| Data Structure 208 | 1 | 2 | 1 | 2 | 2 | 1 | 3 | 4 | 5 | 6 |
| Cluster 308 (q=4) | 1 | 2 | 1 | 2 | 2 | 1 | 3 | 4 | 1 | 3 |
| Cluster 308 (q=5) | 1 | 2 | 1 | 2 | 2 | 1 | 3 | 4 | 5 | 3 |
| Cluster 308 (q=6) | 1 | 2 | 1 | 2 | 2 | 1 | 3 | 4 | 5 | 6 |

Data Structures 108

| ETF Ticker | Median Weight (%) | Mean Weight (%) | Standard Deviation of Weights |
|---|---|---|---|
| A | 14.40 | 14.40 | 0.04 |
| B | 14.26 | 14.26 | 0.04 |
| C | 14.50 | 14.50 | 0.03 |
| D | 14.09 | 14.08 | 0.11 |
| E | 14.40 | 14.40 | 0.05 |
| F | 13.92 | 13.93 | 0.12 |
| G | 14.42 | 14.42 | 0.04 |

FIG. 9

MACHINE LEARNING FOR CLUSTERING UNSTRUCTURED DATA

TECHNICAL FIELD

The disclosure generally relates to clustering data, and more specifically to machine learning systems and methods for clustering unstructured data in a computer network.

BACKGROUND

A clustering analysis may be performed on data structures of a computer system, such that the data structures that have the same or similar attributes are in the same group or cluster. Clustering may be performed on different types of data structures and may be used in areas such as image processing, natural language processing, computer networks, and machine learning.

Existing clustering algorithms have several drawbacks. Some clustering algorithms may not apply to real-world scenarios, such as image or text processing, because the real-world scenarios have only non-negative attributes. Other algorithms require a number of clusters to be specified in advance which may not be possible with large volumes of unstructured data.

BRIEF DESCRIPTION OF THE DRAWINGS

FIG. 2 is a diagram of a table illustrating reference data structures, according to an embodiment.

FIG. 4A is a diagram of a table illustrating a holding matrix that represents attributes of the data structures, according to an embodiment.

FIG. 4B is a diagram of a table illustrating a normalized matrix that represents attributes of the data structures, according to an embodiment.

FIG. 5 illustrates dimensionally reduced matrices generated from a normalized matrix, according to an embodiment.

FIG. 6 is a table illustrating a root mean square error that illustrates an error between a normalized matrix and a product of the dimensionally reduced matrices, according to an embodiment.

FIG. 7 is a diagram of a table illustrating clusters for different factors that correspond to dimensions of the dimensionally reduced matrices, according to an embodiment.

FIG. 9 is a diagram of a table that illustrates a cluster and attributes in the cluster, according to an embodiment.

Figure 1:
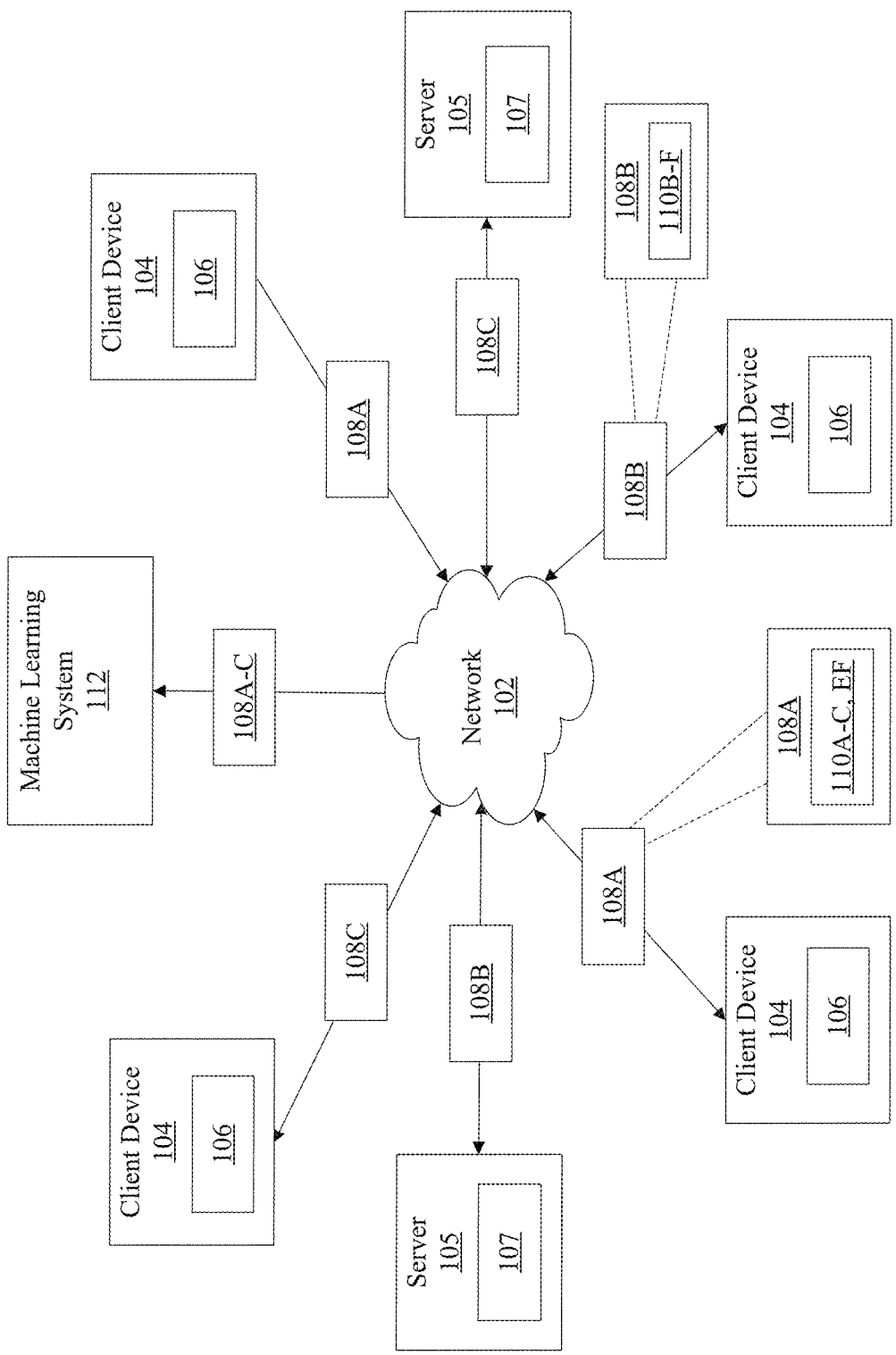
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Some devices in a computer network generate data that may be used by the computer network in any number of ways to produce useful outputs. This data may be network configuration data, image data, malware data, textual documents, financial data, etc. The data may have different characteristics which may be described using data structures that includes attributes. Data that corresponds to an image, for example, may be described as a data structure that stores the image, and attributes that describe different pixels and color of the pixels in the image. Data that corresponds to a textual document may be described as a data structure that includes the document and attributes that include each word in the document. Data that corresponds to malware message may be described as a data structure that may be used to obtain access to an application or device, and include attributes such as user credentials, application credentials, source and destination Internet protocol addresses, etc. Data that corresponds to financial data may include models or financial accounts as a data structure and financial instruments, e.g. stocks, bonds, etc., or assets as attributes. Data that corresponds to network configurations may be described as a data structure that include a network device to be configured and attributes that include configuration data.

Because very large numbers (e.g., millions) of different computing devices can exist in a network, the data that is generated by one device may appear unstructured to other devices. This is because a network may not have a central computing device that dictates a type of the data structure that may be generated by the computing devices, the attributes that may be included in the data structure, or the values for these attributes. One way to determine similarities between the data in different data structures is to determine clusters that include data structures that have the same or similar attributes or a subset of attributes. Accordingly, the embodiments are directed to machine learning systems and methods that generate clusters from unstructured data. Unlike conventional clustering techniques, the machine learning system is trained to generate clusters without first identifying in advance a number of possible clusters that may exist in a network. Further, because the machine learning system generates clusters from real-world data that is often non-negative, the machine learning system can generate clusters using non-negative attributes values and non-negative representations of the attribute values.

Analyzing clusters generated using the machine learning system has numerous benefits. First, the machine learning system may identify to one computing device the data structures that may be generated by other computer devices simply by examining the clusters. Second, the clusters may be analyzed to determine information associated with the clusters. For example, for image data, the clusters may indicate data structures that have the same or similar images. For document data, the clusters may indicate the documents that have the same topic or abstract which may identify trending documents, similar papers or articles, plagiarized articles, sentiment, etc. For network configuration data, the clusters may identify the computing devices that have been successfully or unsuccessfully configured. For financial data, the clusters may identify different exchange-traded funds, the securities included in the funds, and assets that may be invested in the funds. For malware data, the clusters may identify techniques used by malicious users to access computing devices, identify malicious data structures that have the same attributes, and identify a computing device from where the malicious attack has originated, or computing devices targeted.

Further description of the embodiments is discussed below.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network, accessible by the various components of system 100.

System 100 also includes one or more computing or client devices 104 and servers 105. Computing devices 104 may be portable or non-portable electronic devices under the control of a user and configured to transmit, receive, and manipulate data, execute various applications, and communicate with other devices in network 102. Example computing devices 104 may be desktop computers, laptop computers, tablets, smartphones, wearable computing devices, eyeglasses that incorporate computing devices, implantable computing devices, etc.

In some embodiments, network 102 may also include servers 105. Servers 105 may be computer software programs or hardware devices that allow computing devices 104 to access centralized applications, prove processing capabilities and facilitate distribution of data throughout network 102.

Computing devices 104 may execute applications 106 that generate, receive or transmit data. In some instances, the data may be generated in combination with server 105. Applications 106 may be different types of applications that execute on computing device 104. An example application 106 may be an image processing application that generates images of people, animals, objects, places or things, or a face recognition application that generates images of people's faces. Another example application 106 may be a device configuration application for configuring computing devices 104, servers 105, etc. Another example application 106 may be a financial trading or analytics application that generates funds that include stocks, bonds, etc., analyzes funds, stocks, bonds, etc., and or trades funds, stocks, bonds, etc. Another example application 106 may be a natural language processing application that may convert speech to text, process documents to generate document abstracts, recognize similar documents, etc. Application 106 may also be a malware application that may detect hacking attacks on computing devices 104 and/or servers 105 in network 102. In some embodiments, servers 105 may have a counterpart to application 106, such as application 107. Because server 105 may have more processing capabilities than application 106, application 107 may process and manipulate data on behalf of application 106.

In an embodiment, data generated, processed, received and transmitted by applications 106 or 107 may be incorporated into different objects. Example objects may be images, network configurations, funds, documents, etc. The objects may be described as data structures 108, such as data structures 108A-C. Each object may have different characteristics. The characteristics may be incorporated into data structures 108 as attributes 110, such as attributes 110A-F. Each data structure 108 may have some or all attributes 110A-F. For example, data structure 108A may include attributes 110A-C and data structure 108B may include attributes 110B-F. Notably, attributes 110A-F are discussed for illustrative purposes only as there may be tens, hundreds or even thousands of different attributes 110 in data structures 108.

Attributes 110A-F may depend on a type of an object. For example, for image data, attributes 110 may correspond to different portions of the image, different colors in the image, or different objects displayed in the image. In another example, for network configuration data, attributes 110 may be different network configuration attributes used in configuring different types of computing devices 104 or servers 105. In another example, for malware data, attributes 110 may store source and destination Internet protocol addresses, proxy servers, application or user credentials, etc. In another example, for financial data, attributes 110 may be stocks, bonds, or tickers included in different exchange-traded funds. In another example, for document data, attributes 110 may include words, sentences, paragraphs, etc.

Applications 106 and/or 107 executing on different computing devices 104 or servers 105 may generate data structures 108 with different attributes 110. The same type of application, e.g. an image processing application, natural language processing application, network configuration application, financial application, or malware application may generate data structures 108 that may have different attributes 110. For example, application 106 that is an image processing application executing on different computing devices 104 may generate data structure 108A with attributes 110A-C, E, and F for one image and data structure 108B with attributes 110B-F for a second image. In another example, the image processing application executing on different computing devices 104 may generate two images that are data structures 108 with attributes 110A-C that have different values.

In some instances, there may be thousands or millions of computing devices 104 and servers 105 in system 100, all generating data structures 108. However, there may not be a centralized device, such as a centralized computing device 104 or server 105 that tracks different data structures 108 that may exist in system 100, even for a particular type of application 106, or enforces the number, type, or parameters of the attributes 110 that may exist in data structures 108. For example, millions of image processing applications may generate images and there may not be a centralized computing device 104 or server 105 that tracks these images and identifies the same or different images. Accordingly, there may be thousands or even millions of data structures 108, e.g., images that exist in system 100 for a particular type of application 106.

Because there may not be a central computing device 104 or server 105 that tracks data structures 108 or their attributes 110, there may not be a way to track data structures 108 that have the same or similar attributes 110. Accordingly, from a perspective of computing devices 104 in system 110, data structures 108 generated by other computing devices 104 may be unstructured data.

To identify clusters of data structures 108, system 100 includes a machine learning system 112. Machine learning system 112 may receive different types of data structures 108 that exist in system 100. For example, machine learning system 112 may receive image data structures, financial data structures, network data structures, malware data structures, document data structures, etc., and determine clusters of the same or similar data structures 108. Once received, machine learning system 112 may determine a cluster of data structures.

A cluster may include data structures 108 that have the same or similar attributes 110, such as a cluster that includes data structures 108 that have attributes 110A-C. A cluster of data structures 108 may also include the same or similar attributes 110 that have the same or similar values. For example, a cluster of data structures 108 may have attributes 110A-C, where attribute 110A=1, attribute 110A=2, and attribute 110C=3. In another example, a cluster of data structures 108 may include data structures 108 where the values of the attributes constitute a certain percentage or weight out of all attributes 110 included in data structures 108. For example, a cluster may include data structures 108 that have attributes 110A-F where the value of attribute 110A is 10% of the values of attributes 110A-F, the value of attribute 110B is 20% of the values of attributes 110A-F, and the value of attribute 110C is 15% of the values of attributes 110A-F.

A cluster of data structures 108 may include the same images, or images that display the same picture, e.g. a cat, house, etc. In another example, a cluster of data structures 108 may include the same or similar documents, documents that have the same abstract, or documents about the same topic. In another example, a cluster of data structures 108 may include attributes used in a particular type of a hacking attack, such as the same user credential or application credentials, the same proxy sever address, etc. In yet another example, a cluster of data structures 108 may include a cluster of the same or similar exchange traded funds that have the same stocks, bonds, etc., and/or the same ratio of the stocks, bonds, etc.

In some embodiments, application 106 on some computing device 104 may generate data structures 108, such as data structures 108A, that may be based on a reference data structure that is known only to application 106. Data structures 108A are then dispersed throughout system 100. When machine learning system 112 receives data structures 108 from computing devices 104 and servers 105, machine learning system 112 may identify a cluster of data structures 108A without knowing the reference data structure that corresponds or was used to generate data structure 108A.

FIG. 2 is a diagram 200 of a table illustrating reference data structures, according to an embodiment. FIG. 2 illustrates reference data structures 208A and 208B, and corresponding attributes 110A-F. Reference data structure 208A includes attributes 110A-C and 110E-F because attributes 110D is set to zero. Reference data structure 208A also includes attributes 110A-C that have specific values. Reference data structure 208B includes attributes 110B-F because attributes 110A is set to zero. Reference data structure 208B also includes attributes 110B-F that have specific values.

As discussed above, applications 106 or 107 may generate data structures 108A-C that may be based on reference data structures 208A and 208B. For example purposes only, data structures 108A may be based on reference data structure 208A and have the same attributes 110A-C and 110EF as reference data structure 208A. Attributes 110A-C and 110EF in data structure 108A may have the same values as in data structure 208A. Similarly, data structure 108B may be based on reference data structure 208B and have the same attributes 110B-F as reference data structure 208B. Notably, machine learning system 112 may not be aware of reference data structures 208A and 208B. However, when machine learning system 112 is trained to identify clusters, the clusters identified by machine learning system 112 may be compared against reference data structures 208A and 208B to determine whether machine learning system 112 correctly identifies a cluster that includes data structures 108A and another cluster that includes data structures 108B.

Figure 3:
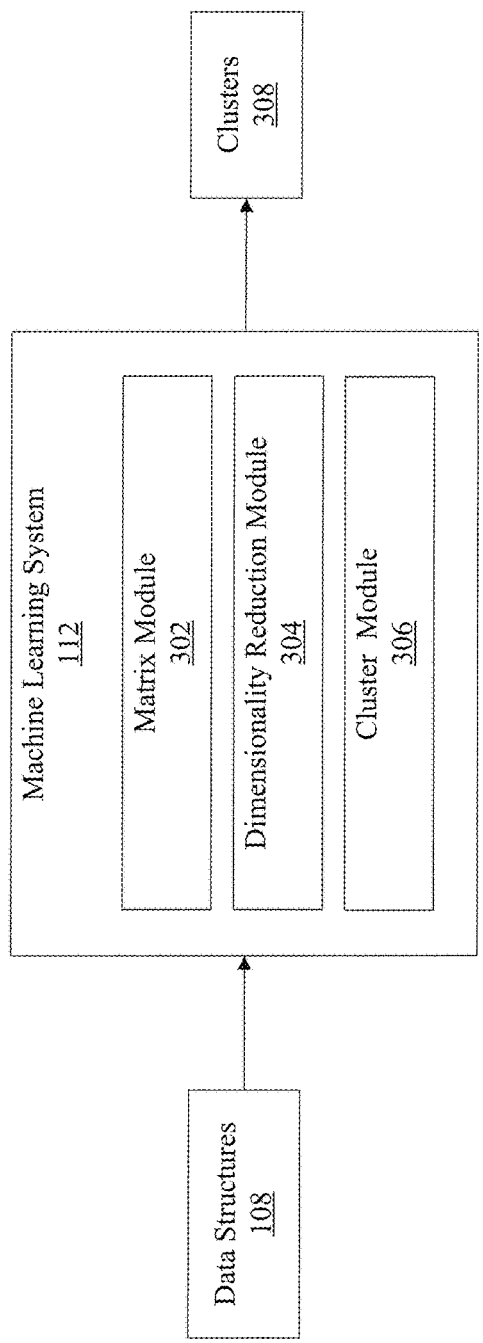
FIG. 3 is a diagram of a machine learning system, according to an embodiment.

FIG. 3 is a diagram 300 of a machine learning system 112, according to some embodiments. The machine learning system 112 includes a matrix module 302, a dimensionality reduction module 304 and a cluster module 306. Machine learning system 112 may receive thousands or millions of data structures 108 in system 100 with different attributes 110 and determine clusters 308 that include the same or similar data structures 118. Each cluster in clusters 308 corresponds to a group of the same or similar data structures 108, such as data structures 108A, 108B, or 108C.

Matrix module 302 may receive data structures 108 and generate a holding matrix. The holding matrix may include all data structures 108 that machine learning system 112 received and may cluster into clusters 308. The holding matrix may have dimensions that are n×p, where n is the number of attributes 110 across all data structures 108 and p is a number of data structures 108.

FIG. 4A is a diagram 400A of a table illustrating a holding matrix, according to an embodiment. For example purposes only, diagram 400A illustrates data structures 108A-J. Data structures 108A-J may include some or all attributes 110A-F. The values of these attributes may be according to the attributes in reference data structures 208A or 208B, or another reference data structure 208. For example, data structures 108A, 108C, and 108F may include attributes 110A-F with values that are the same or similar to reference data structure 208A shown in FIG. 2. In another example, data structures 108B, 108D, and 108E may include attributes 110A-F with values that are the same or similar to reference data structure 208B. Data structures 108G-J may include attributes 110A-110F with values that are similar to some other reference data structures 208 that are not shown in FIG. 2. In some instances, if data structure 108 does not have attribute 110 then some attribute values may be set to zero, such as for data structure 108A and attribute 110D. The embodiments below illustrate how machine learning system 112 identifies one cluster 308 that includes data structures 108A, 108C, and 108F, and another cluster 308 that includes data structures data structures 108B, 108D, and 108E.

From the holding matrix, matrix module 302 may generate a normalized matrix W. In the normalized matrix W, the value of attributes 110 are normalized such that the values in each column add to a predefined number, such as 100. The normalized matrix W may also have dimensions that are n×p, where n is the number of attributes 110 across all data structures 108 and p is a number of data structures 108. An example normalized matrix W is illustrated in FIG. 4B. Although illustrated on a 6×10 scale, the normalized matrix W that matrix module 302 generated may include millions of data structures 108 and thus include millions of columns. Further, because data structures 108 may have different attributes, many of the values in matrix W may be set to zero, causing the normalized matrix W to be sparse.

Because of the high dimensionality, e.g. millions of rows and columns, and also sparse entries, performing conventional clustering techniques may not accurately generate clusters when applied to the normalized matrix W. This is because the conventional clustering techniques may not converge to identify clusters 308. Accordingly, prior to identifying clusters 308, machine learning system 112 may use dimensionality reduction module 302 to reduce the size of the normalized matrix W. In some embodiments, dimensionality reduction module 304 may generate at least two matrices that have reduced dimensionality, that is fewer rows and columns than the normalized matrix W. The matrices that have reduced dimensionality may also have non-negative (zero and positive) entries. In some embodiments, generating matrices with reduced dimensionality while maintaining non-negative entries is important because attributes 110 of certain real-world objects, such as pixels in an image, words in a document, network configurations, funds, stocks, etc., are non-negative entities and do not have a negative component.

In some embodiments, dimensionality reduction module 304 may implement a machine learning technique, such as a non-negative matrix factorization (NMF) algorithm. An NMF algorithm may approximate normalized matrix W using two non-negative matrices that have reduced dimensions. Specifically, the NMF algorithm may determine an approximation of the normalized matrix W as a product of two non-negative matrices R and H such that the normalized matrix W≈RH. Further, matrix R may have dimensions that are n×q and matrix H may have dimensions that are q×p. The value of q may be configurable and may be chosen to reduce the dimensionality of matrix W. In some embodiments, q may be significantly smaller than p. Further, each data structure 108 in the normalized matrix W may be represented using q factors. Notably, the larger the values of p and q, the larger are matrices R and H and more closely the product of matrices R and H approximates matrix W. On the other hand, the smaller the values of p and q, the smaller are matrices R and H, and less closely the product of matrices R and H approximates the normalized matrix W. Accordingly, the value of q relative to p may be determined as a balance between the size of the matrices R and H and the corresponding number of computing operations and an error with which the matrix product of matrices R and H approximates the normalized matrix W.

In some embodiments, the NMF algorithm may provide a lower dimension approximation to the normalized matrix W. The attributes 110 of data structure 108 at position j in the normalized matrix W may be represented by column j of the normalized matrix W and may be modeled as a linear combination of matrix R (with dimensions that are n attributes by q factors) and matrix H (with dimensions that are q factors by p data structures 108). In this way, the weight on attribute i in data structure j is the dot product of row i in matrix R with column j in matrix H. Further, each column in matrix R may indicate a component or a basis element that appears in the attributes 110 included in matrix W, while each column in matrix H may indicate a set of weights that may be applied to each element in matrix R to reconstruct the normalized matrix W.

With reference to real-world applications, suppose data structures 108 are generated or used by an image processing application. In this example, the normalized matrix W may be a set of vectorized images where each column is an image that includes pixels. Notably, the pixel intensity has non-negative values. In this case, matrix R may be a set of relevant facial features and matrix H may represent weights that may reconstruct the facial features in matrix R into the normalized matrix W. In another example, suppose the data structures 108 are included in a textual analysis of a document. In this case, the rows of the normalized matrix W are words and the columns are documents. Each cell in the normalized matrix W may represent the non-negative frequency of occurrence of a word in a document. Here the NMF technique may explain the documents in terms of key underlying topics, where matrix R is the set of relevant topics and matrix H may represent weights that may reconstruct different topics in matrix R into the normalized matrix W. In another example, where the normalized matrix W stores the mutual fund holdings across n stocks and p funds, where p>>n, the NMF algorithm may determine a subset of q "archetypal" or "canonical" funds. In this case, matrix R may represent q canonical long-only portfolios while matrix H represents the loading weights of those portfolios in each fund.

In some embodiments, the NMF algorithm has distinct advantages for clustering data structures 108. The matrix R represents a reduced set of reference data structures while matrix H represents the loadings of these reference data structures in each data structure 108. The similarities in the columns of matrix H mean close correspondence in the ultimate data structures 108.

The NMF algorithm also allows for "soft clustering" of data structures 108. In soft clustering, data structures 108 may still be included in the same clusters when one or more attributes 110 have changed over time. For example, some attributes 110 in data structures 108 may be different from the corresponding reference data structures 208 when the reference data structure 208 changes. For example, suppose a value of attribute 110B in reference data structure 208A has changed. After the change, the new reference data structure 208A may be used to generate new data structures 108A. However, system 100 may still include and process the old data structures 108A that have the old value for attribute 110B. Because the NFM technique allows for "soft clustering", a cluster in clusters 308 may include data structures 108A with an old and new attribute 110B.

For example purposes only, suppose there are q=4 factors. FIG. 5 is a diagram 500 of a table that illustrates the values for matrix R and matrix H that dimensionality reduction module 304 generates when q=4 for the normalized matrix W shown in FIG. 4B. Notably, the values in columns 2, 4, and 5 in matrix H are identical and correspond to the reference data structure 208B in FIG. 2. Also, columns 1, 3, and 6 in matrix H are similar and form a cluster that corresponds to the data structure 208A in FIG. 2. Columns 7-10 of matrix H are distinct from the other columns of matrix H and indicate that columns 7-10 do not correspond to a cluster formed by columns 2, 4, and 5 or a cluster formed by columns 1, 3, and 6. Further, the dimensions of matrix H in the example above is 4×10, that is 40 entries, while the dimensions of the normalized matrix W is 6×10, that is 60 entries. Accordingly, matrix H reduces the size of data by a third without substantially reducing the information stored in the normalized matrix W.

As discussed above, the dimensionality reduction module 304 may dimensionally reduce the normalized matrix W into matrices H and R, whose product approximates the normalized matrix W. In some instances, the matrix product of H and R may have a lower dimension approximation to matrix W. A root mean square error (RMSE) may be used to approximate the error between the dot product of H and R and the normalized matrix W. A deviation matrix E that represents an error may be defined as:

$$E = W - RH$$

Let entries $e_{i,j}$ represent element (i,j) of matrix E. Then the square root of the mean of the (element-by-element) squared differences in the two matrices may be:

$$RMSE = \sqrt{\left(\frac{1}{np}\right)\sum_{i=1}^{n}\sum_{j=1}^{p}(e_{i,j})^2}$$

FIG. 6 is a diagram 600 of a table illustrated the RMSE for different values of q for the matrix E determined from the matrices W, R, and H shown in FIGS. 4B and 5. As illustrated in FIG. 6, the RMSE drops as the number of factors q increases and as the fit improves for q=1, ... 6. This is because, when q=1, the 60 data points in the normalized matrix W are approximated by 16 entries in matrices R and H. As illustrated in FIG. 6, for q=1 the RMSE=19.1%. However, for q=5 and q=6, the RMSE=2.2% and 2.1% respectively. The RMSE is non-zero because the NMF algorithm enforces a non-negative constraint where matrices R and H must have non-negative values only.

In some embodiments, dimensionality reduction module 304 may be trained to determine the number of factors q equal to the second matrix dimension of R and the first matrix dimension of H that may generate the RMSE below an error threshold, after which the cost of generating larger matrices R and H with the lower RMSE outweighs the cost of the number of additional computations or the accuracy of clusters 308.

Going back to FIG. 3, once dimensionality reduction module 304 generates matrix R and matrix H from the normalized matrix W, cluster module 306 may apply a clustering technique, such as a K-means clustering technique to matrix H. In some instances, in the k-means clustering technique, matrix R may represent the cluster centroids, and matrix H may represent cluster member indicators. For example, when a cluster module 306 applies a K-means clustering on matrix H, cluster module 306 may generate clusters 308.

In some embodiments, to generate clusters 308, cluster module 306 may apply a K-means clustering technique using multiple iterations. In the first iteration, the K-mean clustering technique may generate first cluster candidates from matrix H. The number of the first cluster candidates may correspond to a first predefined number of clusters, such as 100 clusters. Next, for each first cluster candidate, cluster module 306 may again use the K-means clustering technique that generates second cluster candidates. The number of second cluster candidates may correspond to a second predefined number of clusters. The second predefined number of clusters may be two clusters. For each second cluster candidate, the cluster module 306 may determine whether one or more of the following criteria is met:

whether the second cluster candidate has more than a predefined number of data structures 108. A predefined number of data structures 108 may be 100 data structures; and whether deviation of weights across the data structures 108 in the second cluster candidate is less than a predefined deviation threshold. The deviation may be a standard deviation of weights or a cross-sectional dispersion in weights across data structures 108 in the second cluster candidate. The predefined deviation threshold may be 0.01 or 0.5%, in some embodiments.

In an embodiment, if the second cluster candidate has more than a predefined number of data structures 108 and the deviation of weights across the data structures 108 in the second cluster candidate is less than the predefined deviation threshold, then cluster module 306 determines the second cluster candidate as cluster 308.

In an embodiment, if the second cluster candidate has more than a configurable number of data structures 108 and the deviation in weights across the data structures 108 in the second cluster candidate is greater than (or equal to) a predefined deviation threshold, then cluster module 306 performs another K-means clustering technique on the second cluster candidate, such that the K-means clustering technique generates a third predefined number of clusters from the second cluster candidate. In some embodiments, the third predefined number of clusters may be two clusters. Cluster module 306 may perform the recursive process above until either cluster module 306 identifies cluster 308 from the second or third cluster candidates or determines that cluster 308 does not exist in the second or third cluster candidates, and continues to other second clusters candidates.

In an embodiment, if the second cluster candidate has less than a predefined number of data structures 108, then cluster module 306 determines that cluster 308 does not exist within the second cluster candidate and continues to other second clusters candidates. If cluster module 306 has processed the second clusters candidates within the first cluster candidate, cluster module 306 may proceed to the next first cluster candidate.

In an embodiment, cluster module 306 continues to iteratively identify clusters 308 until cluster module 306 processes the first cluster candidates, as discussed above.

Notably, unlike conventional clustering techniques that receive a total number of discoverable clusters in advance as input, cluster module 306 continues to identify clusters until the cluster criteria is met and does not require the total number of discoverable clusters.

FIG. 7 is a diagram 700 of a table illustrating the clusters identified from the data structures, according to an embodiment. FIG. 7 illustrates clusters 308, labeled cluster=1 through cluster=6 for different values of q, and data structures 108A-J that correspond to one of clusters=1 ... 6. FIG. 7 also illustrates the reference data structures 208 from data structures 108A-J that have been generated and which correspond to a correct cluster 308 associated with each data structure 108. Reference data structures 208 may be used to determine whether machine learning system 112 is clustering data structures 108A-J into correct clusters 308. For exemplary purposes only, cluster=1 may correspond to reference data structure 208A and cluster=2 may correspond to reference data structure 208B.

As illustrated in FIG. 7, for q=4, cluster module 306 correctly classifies data structures 108A, 108C and 108F as being associated with reference data structure 208A. Cluster module 306 also correctly classifies data structures 108B, 108D and 108E as being associated with reference data structure 208B. However, for q=4, cluster module 306 misclassifies data structure 108I as being associated with reference data structure 208A when it is associated with another reference data structure 208. Cluster module 306 also misclassifies data structure 108J.

As illustrated in FIG. 7, for q=5 and q=6 the classification accuracy of the cluster module 306 improves. For example, for q=5 and q=6, cluster module 306 correctly classifies data structures 108A, 108C and 108F as being associated with reference data structure 208A and data structures 108B, 108D and 108E as being associated with reference data structure 208B. Further, for q=6, cluster module 306 correctly classifies data structures 108G, 108H, 108I, and 108J each being associated with different reference data structures 208, but for q=5 cluster module 306 misclassifies data structure 108J. These results are confirmed by the data structures 110A-J and their attributes 110A-F that are displayed in FIG. 4B.

In some embodiments, machine learning system 112 may be trained on a known dataset. The training may include determining among various algorithms that may be used by dimensionality reduction module 304 and cluster module 306. During training, data structures 118 may belong to a known dataset with known reference data structures 208 and corresponding data structures 108 and attributes 110. Notably, the training dataset may be specific to a type of the application for which machine learning system 112 may determine clusters 308. In some embodiments, during training, machine learning system 112 may also determine the number of factors q that may be used to generate matrices R and H while maintaining the error between the normalized matrix W and the dot product of matrices R and H below the predefined error threshold.

Figure 8:
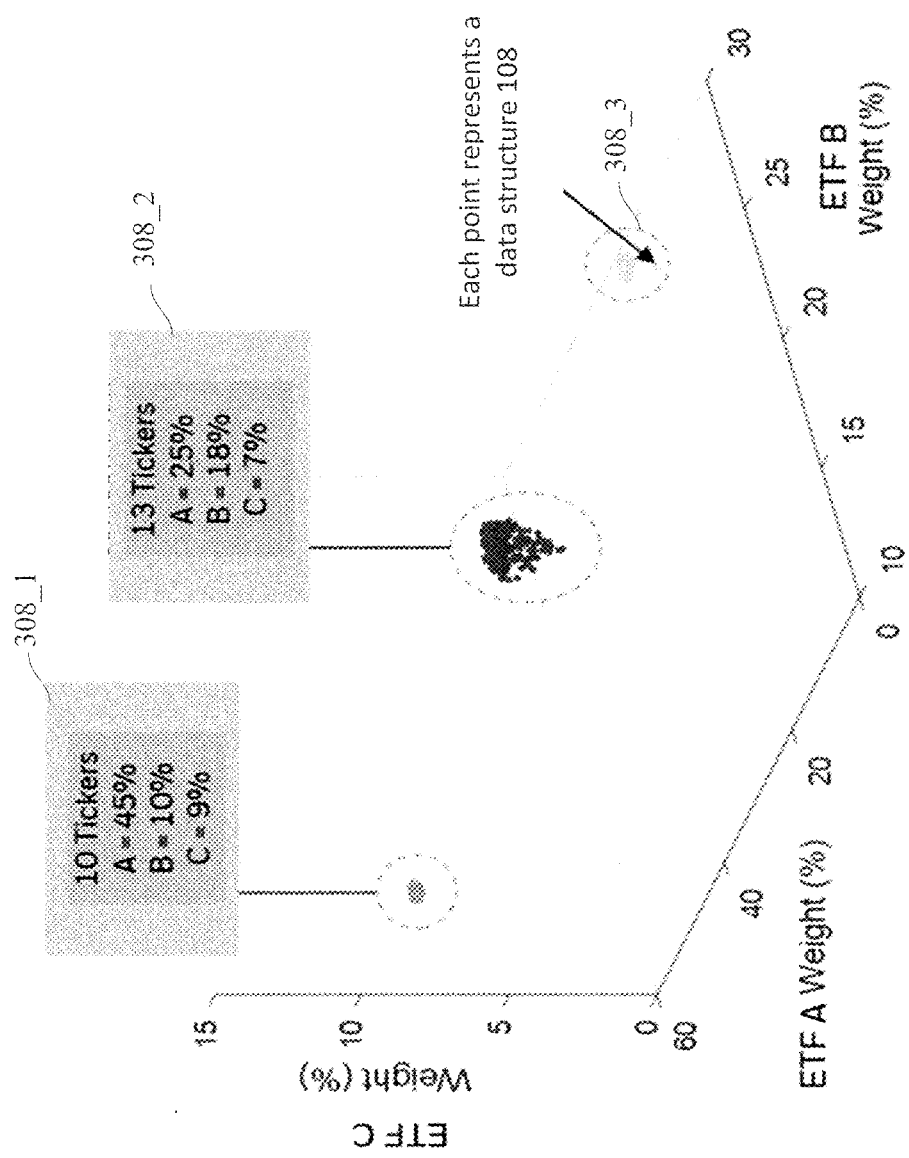
FIG. 8 is a graphical representation of three clusters that have three common attributes found in unstructured data structures, according to an embodiment.

FIG. 8 is a three-dimensional graph 800 of clusters that have three common attributes, according to some embodiments. Although the embodiments in FIG. 8 are described with reference to exchange traded funds and a dataset that includes ETF models as reference data structures 208 and ETF tickers as attributes 110, the embodiments are also applicable to image datasets, document datasets, network dataset, etc. The dataset may include monthly ownership data for the entire ETF range. The dataset includes investor accounts, both retail and institutional, as data structures 108. Machine learning system 112 may be trained to generate clusters 308 that includes accounts with similar ETF tickers. In some instances, the account identifier attribute in data structures 108 may be anonymized but may be used to validate the data structures 108 in clusters 308.

In some embodiments, machine learning system 112 may be trained to identify clusters 308 that include similar accounts (data structures 108) with three or more common ETF tickers (attributes 110). Once machine learning system 112 receives a dataset that includes accounts as data structures 108, the matrix module 302 may generate an n×p holding matrix, where n is a number of ETF tickers and p is a number of accounts. In an embodiment where the accounts dataset includes 370 ETF tickets and 20 million accounts, the holding matrix may be 370 by 20 million, where each column corresponds to an account and each row corresponds to an ETF ticker. The individual entries in the holding matrix may be dollar positions in each account for each ETF ticker. Because each account may not include all ETF tickers, or even a small portion of the ETF tickers, the holding matrix may be a sparse matrix that includes many zeros as entries.

In some embodiments, the matrix module 302 of FIG. 3 may convert the holding matrix into the normalized matrix W. As discussed above, matrix module 302 may convert the holding matrix into the normalized matrix W such that the positions in each column adds up to predefined number, which in this case may be a 100%. Further, because the holding matrix may be sparse, the normalized matrix W may also be sparse.

Once matrix module 302 generates the normalized matrix W, the dimensionality reduction module 304 may generate matrices H and R using q factors, where q may be a positive integer and corresponds to the number of columns in matrix R and a number of rows in matrix H. The cluster module 306 may apply a clustering algorithm, such as a K-clustering algorithm, to matrix H to identify clusters 308 that include three or more common ETF tickers. FIG. 8, for example, illustrates clusters 308_1, 308_2, and 308_3 that includes three common ETF tickers, ETF ticker A, ETF ticker B, and ETF ticker C in different proportions as well as other ETF tickers. For example, cluster 308_1 may include 10 different ETF tickers, including ETF tickers A, B, and C, and 812 different accounts (data structures 108). In another example, cluster 308_2 may include 13 different tickers, including ETF tickers A, B, and C, and 22,358 different accounts (data structures 108).

FIG. 9 is a diagram 900 of a table that illustrates a cluster, according to an embodiment. FIG. 9 illustrates cluster 308_4 that includes seven ETF tickers (attributes 110) that have an approximately the same weight.

Figure 10:
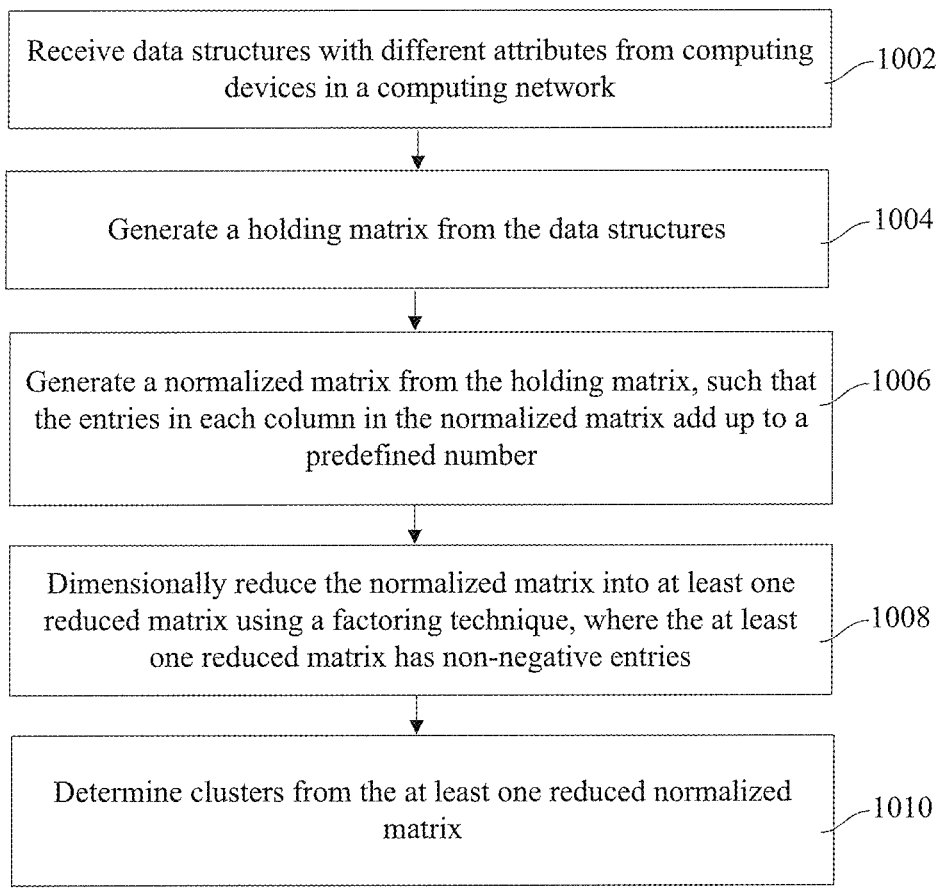
FIGS. 10-11 are flow diagrams of a method for determining clusters from unstructured data structures, according to an embodiment.

FIG. 10 is a flow diagram of a method 1000 for determining clusters, according to an embodiment. Method 1000 may be performed using hardware and/or software components described in FIGS. 1-9. Note that one or more of the operations may be deleted, combined, or performed in a different order as appropriate.

At operation 1002, data structures are received. For example, machine learning system 112 receives data structures 108 over network 102. There may be thousands or millions of data structures 108 in network 102. Data structures 108 may be generated using various computing devices 104 and/or servers 105 and include various attributes 110. Data structures 108 may be generated based on reference data structures 208 that are unknown among computing devices 104 or servers 105. Accordingly, machine learning system 112 receives random, unstructured, data structures 108, and determines clusters 308 that include the same or similar data structures 108.

At operation 1004, a holding matrix is generated. For example, matrix module 302 may generate a holding matrix from data structures 108. The holding matrix may include data structures 108 as columns, one data structure per column, and attributes 110 as rows. The entries in the holding matrix may be the values of attributes 110 or zeros when data structure 108 does not include one of attributes 110 that corresponds to a row in the holding matrix.

At operation 1006, a normalized matrix is generated. For example, matrix module 302 may generate a normalized matrix W from the holding matrix. The normalized matrix W may include the normalized entries of the holding matrix, such that each column adds to a predefined number, such as 100.

At operation 1008, dimensionally reduced matrices are generated. For example, dimensionality reduction module 304 may reduce the normalized matrix W into matrix R and matrix H that have a lower dimensionality than the normalized matrix W. As discussed above, the dimensionality may be based on the q factors. In some embodiments, the dimensionality reduction module 304 may use an NMF algorithm to dimensionally reduce matrix W such that the entries in matrix H and matrix R are non-negative. The number of factors q may correspond to the columns in matrix R and the rows in matrix H. Notably, the lower the number of q factors, the smaller the matrix H and matrix R, but the product of matrix H and matrix R is also less accurate when compared to the normalized matrix W. The larger the number of q factors, the larger the matrix H and matrix R and the product of matrix H and matrix R is also more accurate when compared to the normalized matrix W. In some instances, dimensionality reduction module 304 may be trained to determine the number of q factors that may reduce the dimensionality of the normalized matrix R while minimizing the information stored in the normalized matrix R. Typically, dimensionality reduction module 304 may be trained to identify the number of q such that the error between the normalized matrix W and the product of matrix H and matrix R is less than the predefined error threshold.

At operation 1010, clusters are generated. For example, cluster module 306 may use matrix H to generate clusters 308. The clusters 308 may correspond to reference data structures 208. Notably, cluster module 306 generates clusters 308 without receiving a predefined number of possible clusters 308 as input. Operation 1010 is further discussed in FIG. 11.

Figure 11:
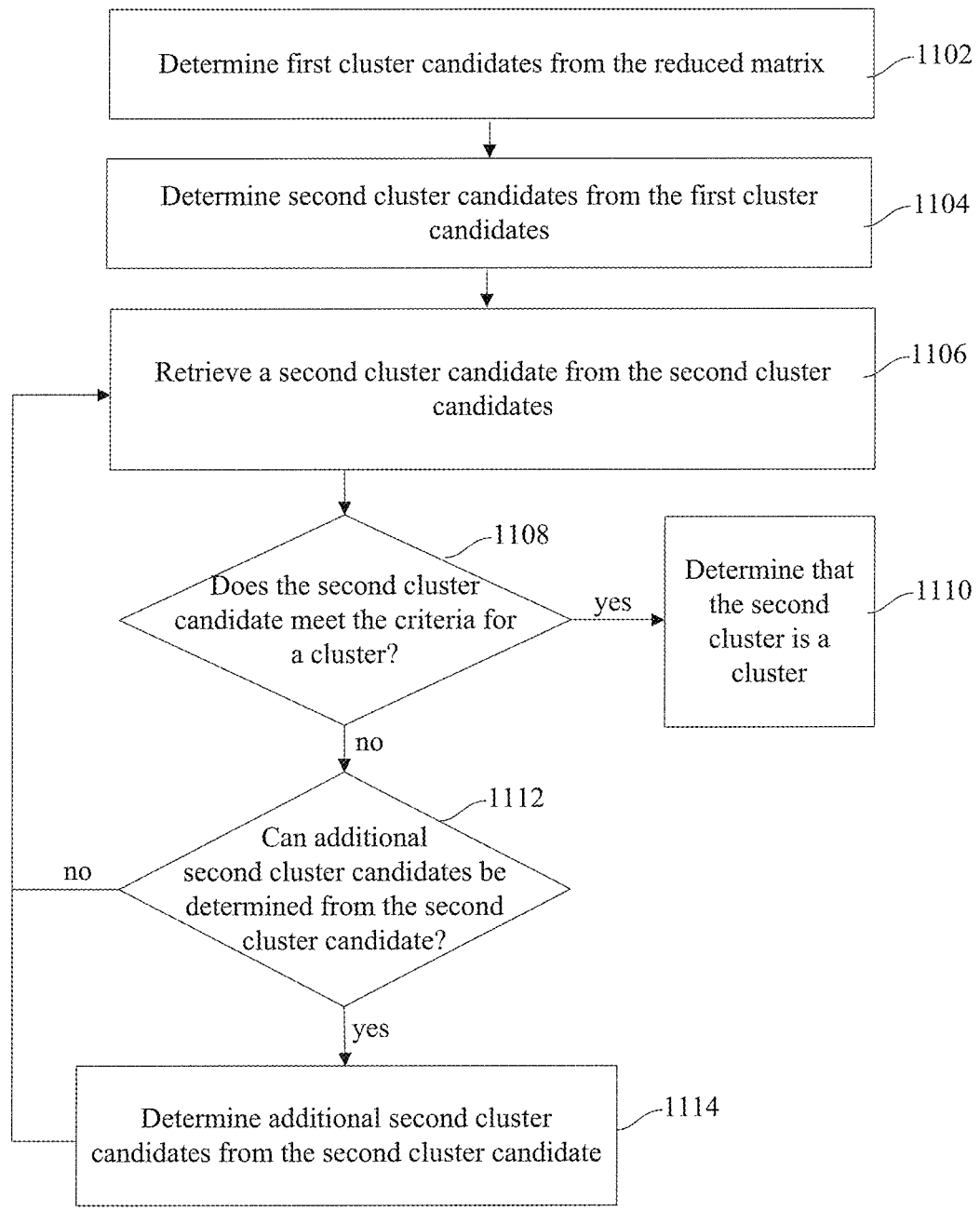

FIG. 11 is a flow diagram of a method 1100 for generating clusters, according to an embodiment. Method 1100 may be performed using hardware and/or software components described in FIGS. 1-9. Note that one or more of the operations may be deleted, combined, or performed in a different order as appropriate.

At operation 1102, first cluster candidates are determinized. For example, cluster module 306 may generate a first predefined number of first cluster candidates, e.g. 100 first cluster candidates from matrix H.

At operation 1104, second cluster candidates are determined from the first clusters candidates. For example, for each first cluster candidate, cluster module 306 may generate a second predetermined number of second clusters candidates, e.g., two second clusters candidates for each first cluster candidate.

At operation 1106, a second cluster candidate is retrieved. The second cluster candidate may be retrieved from the second cluster candidates generated in operation 1104 or from the additional second cluster candidates generated in operation 1114 discussed below.

At operation 1108, a determination whether the second cluster candidate meets criteria for being cluster 308 is made. For example, cluster module 306 determines criteria that identifies the second cluster candidate as cluster 308. An example criteria may be whether the second cluster candidate has more than a configurable number of data structures 108. Another example criteria may be whether the deviation of weights across data structures 108 in the second cluster candidate is less than predefined deviation threshold. In some instances, to determine whether the second cluster candidate as cluster 308, cluster module 306 evaluates both criteria discussed above. Specifically, if the second cluster candidate has more than a configurable number of data structures 108, e.g., 100, and the deviation of weights across all data structures 108 in the second cluster candidate is less than a predefined deviation threshold, cluster module 306 determines that second cluster is cluster 308 at operation 1110. However, if one or both criteria above is false, the method proceeds to operation 1112.

At operation 1112, a determination is made whether additional second cluster candidates may be generated from the second cluster candidate. For example, cluster module 306 determines criteria that indicates that additional second clusters may be determined from the second cluster candidate. For example, cluster module 306 may determine that the second cluster candidate has more than a configurable number of data structures 108, e.g., 100, data structures 108 but the standard deviation of weights across data structures 108 in the second cluster candidate is greater than a configurable percentage, in which case additional second cluster candidates may be generated. On the other hand, cluster module 306 may determine that the second cluster candidate has less than a configurable number of data structures 108, e.g., 100, data structures 108 and deviation of weights across data structures 108 in the second cluster candidate is greater than the predefined deviation threshold. In this case, cluster module 306 may determine that cluster 308 may not be generated from the second cluster candidate, and the method proceeds to operation 1106 at which point another second cluster candidate from the second cluster candidates generated in operation 1104 is retrieved.

At operation 1114, additional second cluster candidates from the second cluster candidate are determined. For example, cluster module 306 may use a clustering technique, such as a K-means clustering technique to generate a second predefined number of clusters from the second cluster candidates as additional second cluster candidates. Once the additional second cluster candidates are generated, the additional second cluster candidates are combined with the second cluster candidates and the method proceeds to operation 1106.

In some embodiments, operation 1106 may retrieve second cluster candidates from the additional cluster candidates prior to retrieving another second cluster candidates determined in operation 1104. Method 1100 may continue recursively until all second cluster candidates determined in operations 1104 and 1114 are processed.

In some embodiments, clusters may be analyzed using various computing devices, such as client devices 104, servers 105 and/or machine learning system 112 discussed in FIG. 1. The analysis may indicate to the computing devices different types of data structures 108 that may exist in a computing system. Further the clusters may indicate various trends that may exist in system 100 but may not be identified by analyzing a single data structure. Further, in one example, a cluster of images may indicate to certain image trends, such as trending news, or characteristics of an image that may be used to obtain unauthorized access to a system that uses face recognition. In another example, a cluster that included document data may also indicate to trending news, popular articles or events, or an abstract of a document. In another example, a cluster of configuration data may identify client devices 104 that may have been successfully or unsuccessfully upgraded. In another example, clusters may identify different exchange-traded funds, the securities included in the funds, and assets that may be invested in the funds. In another example, clusters may identify common trends used by malicious users to access computing devices, identify malicious data structures that have the same attributes, and identify client devices 104 that may have been targeted.

Figure 12:
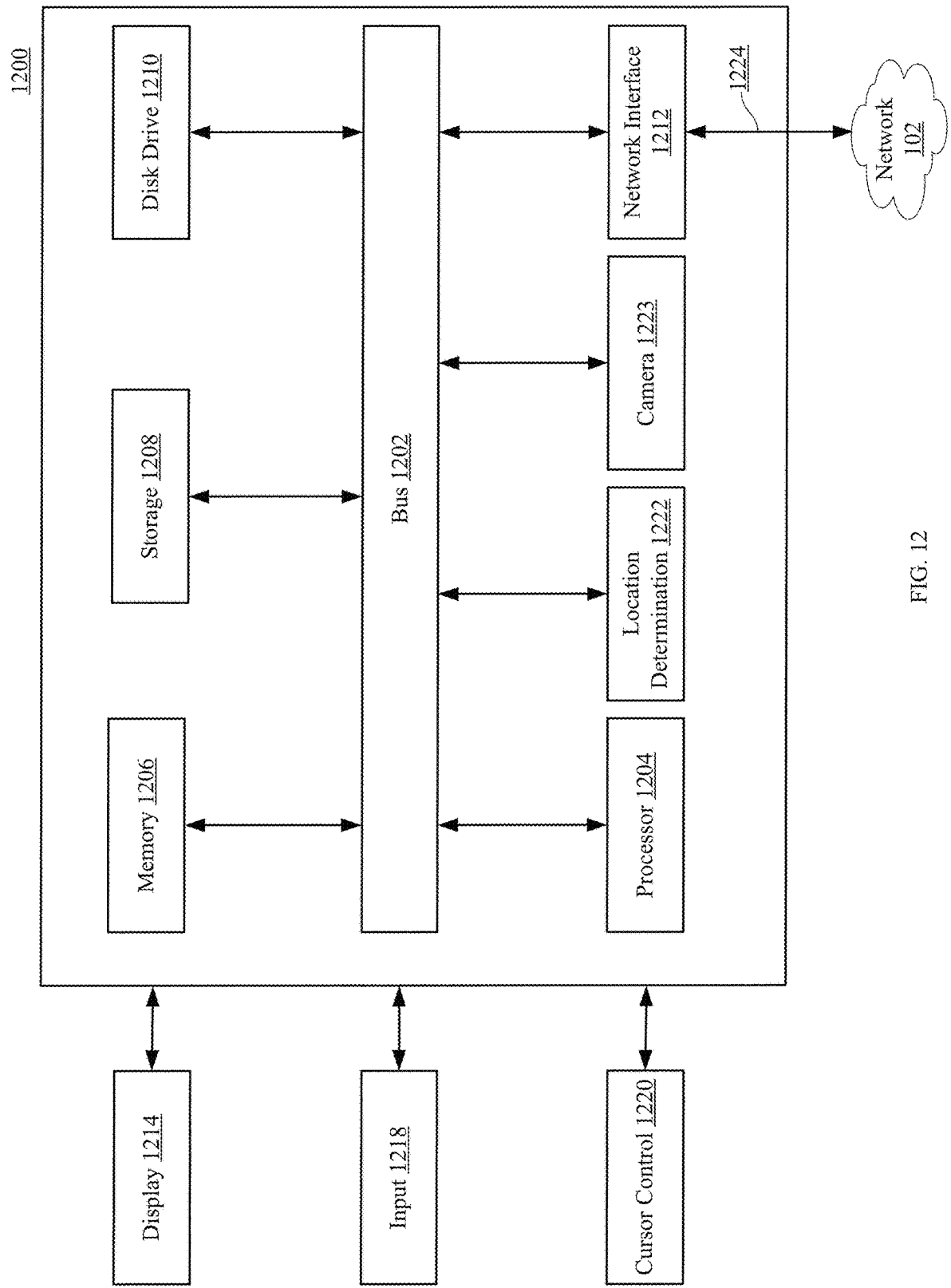
FIG. 12 is a block diagram of a computer system suitable for implementing one or more components or operations in FIGS. 1-11, according to an embodiment.

Referring now to FIG. 12 an embodiment of a computer system 1200 suitable for implementing, the systems and methods described in FIGS. 1-11 is illustrated.

In accordance with various embodiments of the disclosure, computer system 1200, such as a computer and/or a server, includes a bus 1202 or other communication mechanism for communicating information, which interconnects subsystems and components, such as a processing component 1204 (e.g., processor, micro-controller, digital signal processor (DSP), graphics processing unit (GPU), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), a location determination component 1222 (e.g., a Global Positioning System (GPS) device as illustrated, a cell tower triangulation device, and/or a variety of other location determination devices known in the art), and/or a camera component 1223. In one implementation, the disk drive component 1210 may comprise a database having one or more disk drive components.

In accordance with embodiments of the disclosure, the computer system 1200 performs specific operations by the processing component 1204 executing one or more sequences of instructions contained in the memory component 1206, such as described herein with respect to the mobile communications devices, mobile devices, and/or servers. Such instructions may be read into the system memory component 1206 from another computer readable medium, such as the static storage component 1208 or the disk drive component 1210. In other embodiments, hard-wired circuitry may be used in place of or in combination with software instructions to implement the disclosure.

Logic may be encoded in a computer readable medium, which may refer to any medium that participates in providing instructions to the processing component 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1200. In various other embodiments of the disclosure, a plurality of the computer systems 1200 coupled by a communication link 1224 to the network (e.g., such as a LAN, WLAN, PTSN, and/or various other wired or wireless networks, including telecommunications, mobile, and cellular phone networks) may perform instruction sequences to practice the disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method for clustering data, the method comprising:
generating data structures at different and unrelated applications configured to execute on computing devices communicatively connected by the computing network and transmitted over the computing network, wherein the data structures include a plurality of attributes, and wherein the data structures generated by the different unrelated applications have different attributes in the plurality of attributes and different values for the different attributes;
receiving the data structures at a machine learning system connected to a computing network;
storing, in at least one memory, a first matrix generated from the data structures and the plurality of attributes, wherein columns of the first matrix correspond to a number of the data structures received at the machine learning system, one column in the columns of the first matrix per data structure in the data structures, and wherein rows of the first matrix correspond to the plurality of attributes included in the data structures, one attribute per first row;
storing, in the at least one memory, a second matrix generated from the first matrix, wherein columns of the second matrix correspond to the data structures, one column in the columns of the second matrix per the data structure in the data structures and wherein rows of the second matrix correspond to the plurality of attributes included in the data structures, the one attribute per row and wherein values of entries in each column in the columns of the second matrix add to a same predefined value;
storing, in the at least one memory, a reduced matrix generated from the second matrix using a dimensionality reduction module of the machine learning system and a number of factors, wherein a dimension of the reduced matrix includes the number of factors and entries in the reduced matrix are non-negative entries;

determining, using a cluster module of the machine learning system, clusters from the reduced matrix, wherein each cluster corresponds to a subset of data structures from the data structures received from the computing network that include a same subset of attributes from the plurality of attributes; and identifying, using the machine learning system, from an attribute in the subset of data structures in each cluster that includes the same subset of attributes, a subset of computing devices in the plurality of computing devices in the computer network that generated the subset of data structures.

2. The method of claim 1, wherein the determining further comprises:

determining, using a K-means algorithm in the cluster module and a first number of predefined clusters, first cluster candidates from the reduced matrix;

determining, using the K-means algorithm and a second number of predefined clusters, a second number of cluster candidates from each first cluster candidate; and determining that a second cluster candidate from the second cluster candidates is a cluster from the clusters when the second cluster candidate satisfies cluster criteria.

3. The method of claim 2, wherein a cluster criterion in the cluster criteria is whether the second cluster candidate includes more than a predetermined number of data structures from the data structures.

4. The method of claim 2, wherein a cluster criterion in the cluster criteria is whether a deviation of weights across data structures in the second cluster candidate is less than a predetermined threshold.

5. The method of claim 2, further comprising:

determining that the second cluster candidate from the second cluster candidates is not a cluster from the clusters when the second cluster candidate does not satisfy the cluster criteria.

6. The method of claim 2, further comprising:

determining that the second cluster candidate from the second cluster candidates includes more than a predetermined number of data structures from the data structures;

determining, using the K-means algorithm and the second number of predefined clusters, third cluster candidates from the second cluster candidate, wherein a number of third cluster candidates is the second number of predefined clusters; and determining that a third cluster candidate from the third cluster candidates is a cluster from the clusters when the third cluster candidate meets the cluster criteria.

7. The method of claim 2, further comprising:

determining that the second cluster candidate from the second cluster candidates includes more than a predefined number of data structures from the data structures;

determining, using the K-means algorithm and a third number of predefined clusters, a third number of third cluster candidates from the second cluster candidate; and determining that a third cluster candidate from the third cluster candidates is a cluster from the clusters when the third cluster candidate meets the cluster criteria.

8. The method of claim 1, further comprising:

setting an entry in the second matrix to a zero in the one column of the columns that corresponds to a data structure in the data structures and in the row in the rows that corresponds to an attribute in the plurality of attributes that is not included in the data structure.

9. The method of claim 1, wherein a first cluster in the clusters includes a first set of data structures with a first set of attributes and a second cluster in the clusters includes a second set of data structures with a second set of attributes different from the first set of attributes.

10. The method of claim 1, wherein a first cluster in the clusters includes a first set of data structures with a first set of attributes having first values and a second cluster in the clusters includes a second set of data structures with the first set of attributes having second values.

11. The method of claim 1, wherein the data structures include images, the plurality of attributes corresponding to attributes of the images, and a first cluster in the clusters includes a first set of data structures with a first image in the images and a second cluster in the clusters includes a second set of data structures with a second image in the images.

12. The method of claim 1, wherein the data structures include models, the plurality of attributes correspond to attributes of the models, and a first cluster in the clusters includes a first set of data structures with a set of first attributes that correspond to a first model in the models and a second clusters in the clusters includes a second set of data structures with a set of a second attributes that correspond to a second model in the models.

13. The method of claim 1, further comprising:

generating a second reduced matrix from the second matrix, wherein a combination of the reduced matrix and the second reduced matrix is an approximation of the second matrix less an error.

14. A system comprising:

a non-transitory memory storing instructions; and one or more hardware processors coupled to the non-transitory memory and configured to read the instructions from the non-transitory memory to cause the system to perform operations comprising:

collecting data structures generated by different and unrelated applications configured to execute on computing devices communicatively connected to a computing network without a central computing device configuring structures of the data structures, wherein the data structures include different attributes in a plurality of attributes and different values for the different attributes and comprise source Internet Protocol (IP) addresses;

receiving the data structures at a machine learning system;

storing, in at least one memory, a holding matrix generated from the data structures and the plurality of attributes in the data structures, wherein dimensions of the holding matrix are a number of the data structures received by the machine learning system and a number of the plurality of attributes in all the data structures, and wherein the holding matrix includes entries that are the plurality of attributes of the data structures;

normalizing the holding matrix into a normalized holding matrix, wherein values of entries in each column of the normalized holding matrix add to a same predefined value;

factoring, using a dimensionality reduction module of the machine learning system, the normalized holding matrix into a first reduced matrix and a second reduced matrix, wherein the first reduced matrix and the second reduced matrix have a reduced dimensionality from the normalized holding matrix by a number of predefined factors, and wherein one of dimensions in the first reduced matrix and one of dimensions in the second reduced matrix is a number of factors and entries in the first reduced matrix and the second reduced matrix are non-negative entries;

determining, using a cluster module of the machine learning system, clusters from the first reduced matrix, wherein each cluster corresponds to a subset of data structures from the data structures received from the computing network that include a subset of attributes from the plurality of attributes; and identifying, using the machine learning system, from an attribute storing a source IP address in the subset of data structures in each cluster that includes the subset of attributes, a subset of computing devices in the plurality of computing devices in the computer network that generated the subset of data structures.

15. The system of claim 14, wherein determining the clusters further comprises:
   determining, using a K-means algorithm and a first number of predefined clusters, first cluster candidates from the first reduced matrix;
   determining, using the K-means algorithm and a second number of predefined clusters, a second number of cluster candidates from each first cluster candidate; and
   determining that a second cluster candidate from the second cluster candidates is a cluster from the clusters when the second cluster candidate meets cluster criteria.

16. The system of claim 15, wherein a cluster criterion in the cluster criteria is whether the second cluster candidate includes more than a predefined number of data structures from the data structures.

17. The system of claim 15, wherein a cluster criterion in the cluster criteria is whether deviation of weights across data structures in the cluster is less than a predetermined threshold.

18. The system of claim 15, wherein the operations further comprise:
   determining that the second cluster candidate from the second cluster candidates includes more than a predetermined number of data structures from the data structures;
   determining, using the K-means algorithm and the second number of predefined clusters, the second number of third cluster candidates from the second cluster candidate; and
   determining that a third cluster candidate from the third cluster candidates is a cluster from the clusters when the third cluster candidate meets the cluster criteria.

19. The system of claim 14, wherein the operations further comprise:
   training the dimensionality reduction module, wherein the training comprises:
      determining a product of the first reduced matrix and the second reduced matrix;
      determining an error between the normalized holding matrix and the product; and
      modifying the number of predefined factors based on the determined error.

20. A non-transitory machine-readable medium having stored thereon machine-readable instructions executable to cause a machine to perform operations for determining clusters of data structures in a computing network, the operations comprising:
   receiving data structures at a machine learning system, wherein the data structures are generated by unrelated computing devices communicatively connected by the computing network and without a central computing device configuring a number and type of attributes in the data structures, and wherein the data structures include different attributes in a plurality of attributes and different values for the different attributes;
   generating a holding matrix from the data structures and the plurality of attributes;
   storing the holding matrix in at least one memory;
   normalizing the holding matrix into a normalized holding matrix, wherein values of entries in each column of the normalized holding matrix add to a same predefined value;
   factoring, using a dimensionality reduction module of the machine learning system, the normalized holding matrix into a first reduced matrix and a second reduced matrix, the first reduced matrix and the second reduced matrix having a reduced dimensionality from the normalized holding matrix by a number of factors, wherein one of dimensions of the first reduced matrix and one of dimensions of the second reduced matrix is the number of factors and entries in the first reduced matrix and the second reduced matrix are non-negative entries; and
   determining, using a cluster module of the machine learning system, clusters from the first reduced matrix, wherein a first cluster in the clusters includes to a subset of data structures from the data structures that include a first set of attributes from the plurality of attributes and a second cluster in the clusters includes a second subset of data structures that include a second set of attributes from the plurality of attributes, different from the first set of attributes; and
   identifying, from an attribute in the subset of data structures of the first cluster a first type of application that generated the subset of data structures on a first subset of computing devices and from a second attribute in the second subset of data structures of the second cluster a second type of application that generated the second subset of data structures on a second subset of computing devices, wherein the first type of application is indicative of a malware application and the second type of application is not indicative of the malware application.

* * * * *